(12) United States Patent
Lee et al.

(10) Patent No.: US 8,605,802 B2
(45) Date of Patent: Dec. 10, 2013

(54) FRAME STRUCTURE FOR FAST WIRELESS COMMUNICATION SYSTEM AND APPARATUS FOR FAST WIRELESS COMMUNICATION USING THE FRAME

(75) Inventors: Woo Yong Lee, Daejeon (KR); Kyeongpyo Kim, Daejeon (KR); Jin Kyeong Kim, Daejeon (KR); Yong Sun Kim, Daejeon (KR); Hyoung Jin Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 593 days.

(21) Appl. No.: 12/676,537

(22) PCT Filed: Sep. 3, 2008

(86) PCT No.: PCT/KR2008/005179
§ 371 (c)(1),
(2), (4) Date: Mar. 4, 2010

(87) PCT Pub. No.: WO2009/031808
PCT Pub. Date: Mar. 12, 2009

(65) Prior Publication Data
US 2010/0208832 A1    Aug. 19, 2010

(30) Foreign Application Priority Data

Sep. 4, 2007  (KR) .................. 10-2007-0089572
Aug. 25, 2008  (KR) .................. 10-2008-0082852

(51) Int. Cl.
*H04K 1/10*        (2006.01)
*H04L 27/28*       (2006.01)
(52) U.S. Cl.
USPC ..................................... 375/260

(58) Field of Classification Search
USPC ......... 375/222, 260, 295, 316, 340, 345, 365,
375/367; 370/204, 210, 235, 337, 344, 347,
370/389
See application file for complete search history.

(56) References Cited

U.S. PATENT DOCUMENTS 6,128,332 A * 10/2000 Fukawa et al. ................ 375/146
2004/0043751 A1* 3/2004 Amalfitano et al. ........... 455/403

(Continued)

FOREIGN PATENT DOCUMENTS

JP    2002-290368 A    10/2002
JP    2004-159303 A    6/2004

(Continued)

OTHER PUBLICATIONS

Chih-Lin I, et al; "Multi-Code CDMA Wireless Personal Communications Networks", IEEE International Conference on Communications, Jun. 18-22, 1995, pp. 1060-1064.

(Continued)

*Primary Examiner* — Sam K Ahn
*Assistant Examiner* — Syed Haider
(74) *Attorney, Agent, or Firm* — Ladas & Parry LLP

(57) ABSTRACT

A method of configuring a frame for fast wireless communication and an apparatus for fast wireless communication are provided. The apparatus for fast wireless communication includes: a frame configuration unit configuring a frame including transmission data; a demultiplexing unit demultiplexing the transmission data included in the frame into N number of parallel streams (N: positive number greater than 2); N number of coding and modulation units connected in parallel to perform error correction coding and orthogonal frequency division multiplexing (OFDM) with respect to each of the N number of parallel streams; and a multiplexing unit multiplexing outputs of the N number of coding and modulation units into serial streams.

16 Claims, 7 Drawing Sheets

(56) References Cited

U.S. PATENT DOCUMENTS

| | | | |
|---|---|---|---|
| 2004/0120438 A1* | 6/2004 | Forte | 375/367 |
| 2006/0067278 A1* | 3/2006 | Li et al. | 370/335 |
| 2006/0115010 A1* | 6/2006 | Rog et al. | 375/260 |
| 2007/0064669 A1* | 3/2007 | Classon et al. | 370/347 |
| 2007/0098095 A1* | 5/2007 | Kim et al. | 375/260 |
| 2007/0110055 A1* | 5/2007 | Fischer et al. | 370/389 |
| 2007/0189151 A1* | 8/2007 | Pan et al. | 370/210 |
| 2007/0291696 A1* | 12/2007 | Zhang et al. | 370/331 |
| 2008/0049709 A1* | 2/2008 | Pan et al. | 370/344 |
| 2008/0240159 A1* | 10/2008 | Palanki et al. | 370/474 |
| 2011/0249764 A1* | 10/2011 | Sawahashi et al. | 375/260 |

FOREIGN PATENT DOCUMENTS

| | | |
|---|---|---|
| JP | 2005-295239 A | 10/2005 |
| KR | 1020040005175 A | 1/2004 |
| KR | 1020060066615 A | 6/2006 |
| KR | 1020070088237 A | 8/2007 |

OTHER PUBLICATIONS

International Search Report: PCT/KR2008/005179.

* cited by examiner

FRAME STRUCTURE FOR FAST WIRELESS COMMUNICATION SYSTEM AND APPARATUS FOR FAST WIRELESS COMMUNICATION USING THE FRAME

TECHNICAL FIELD

The present invention relates to a fast wireless communication system, and more particularly, to a method for configuring a frame and an apparatus for fast wireless communication using the method.

This work was supported by the IT R&D program of MIC/IITA [2007-S-002-01, The Development of Multi-Gigabit Wireless Interface Technology].

BACKGROUND ART

As of recent, with the development of the communication industry and the increase in demands of Internet users, systems capable of transmitting data at high speed are introduced into the market. An orthogonal frequency division multiplexing (OFDM) system utilizes multi-carriers to transmit data by converting symbol streams which are inputted in series to parallel symbol streams, and the parallel symbol streams are modulated into multi-subcarriers with properties of mutual orthogonality, and the OFDM is a type of Multi-Carrier Modulation (MCM).

Conversely, the OFDM system changes a inverse Fast Fourier Transform (IFFT) size to adjust transmission speed. Also, the OFDM system parallelizes only a portion for performing Analog Digital Convert/Digital Analog Converter (ADC/DAC), or a unit responsible for performing demodulation and decoding. As such, a conventional OFDM system does not offer a structure which may enhance processing speed of overall hardware.

Consequently, an apparatus for fast communication which is capable of enhancing the overall processing speed of hardware is now in demand.

DISCLOSURE OF INVENTION

Technical Goals

The present invention provides a method for configuring a frame structure and a fast wireless communication system using the method which can increase internal operational speed of the system and increase the data quantity to be processed in a single process by adjusting a number of parallel streams in the fast wireless communication system.

Also, the present invention provides a method for configuring a frame structure for fast wireless communication and a fast wireless communication system using the method which can maintain high speed data transmission with a relatively slow system clock speed when implementing a digital circuit of the fast wireless communication system.

Technical Solutions

According to an exemplary embodiment of the present invention, there is provided an apparatus for fast wireless communication including: a frame configuration unit configuring a frame including transmission data; a demultiplexing unit demultiplexing the transmission data included in the frame into N number of parallel streams (N: positive number greater than 2); N number of coding and modulation units connected in parallel to perform error correction coding and orthogonal frequency division multiplexing (OFDM) with respect to each of the N number of parallel streams; and a multiplexing unit multiplexing outputs of the N number of coding and modulation units into serial streams.

In this instance, the frame configuration unit may provide scramble the transmission data according to a scrambling polynomial to provide the scrambled transmission data to the demultiplexing unit.

In this instance, the N number of coding and modulation units may include: a convolutional encoder performing error correction coding with respect to an inputted stream according to a convolution polynomial; an interleaver interleaving the coded inputted stream; an inverse Fast Fourier Transformer performing inverse Fast Fourier Transform (IFFT) with respect to the interleaved signal, outputted from the interleaver, into a time domain signal; and a cyclic prefix (CP) insertion unit inserting a cyclic prefix into the time domain signal.

In this instance, the frame may include a short symbol giving notification about a start of a frame, a long symbol for channel estimation, a signal symbol having information for demodulation, and a data symbol having a transmission symbol.

According to an exemplary embodiment of the present invention, there is provided a method for configuring a frame for fast wireless communication including: configuring a short symbol giving notification about a start of a fast wireless communication frame; configuring a long symbol estimating a channel which transmits the fast wireless communication frame; configuring a signal symbol demodulating the fast wireless communication frame; and configuring a data symbol of transmission data to be transmitted via the fast wireless communication frame.

In this instance, the short symbol may be configured by iterating a signal stream having a 128-sample length 12 times, and the $12^{th}$ iterated signal stream has a phase difference of 180 degrees from a $11^{th}$ iterated signal stream.

In this instance, the short symbol may generate 512 complex numbers using a value corresponding to a subcarrier index shown in the following table,

| SUBCARRIER INDEX | VALUES |
| --- | --- |
| −196 | 1 |
| −164 | −1 |
| −180 | 1 |
| −148 | −1 |
| −132 | 1 |
| −116 | 1 |
| −100 | 1 |
| −84 | −1 |
| −68 | 1 |
| −60 | 1 |
| −44 | −1 |
| −28 | −1 |
| −12 | −1 |
| 4 | −1 |
| 20 | −1 |
| 36 | 1 |
| 52 | 1 |
| 72 | −1 |
| 88 | 1 |
| 104 | −1 |
| 120 | −1 |
| 136 | 1 |
| 152 | −1 |
| 168 | −1 |
| 184 | −1 |
| 192 | −1 |

(where the real parts and imaginary parts of the 512 complex numbers are identical).

In this instance, the short symbol may generate the 512 complex numbers by performing IFFT.

In this instance, the subcarrier for transmitting the short symbol may be generated from a permutation having a maximum length of 31.

In this instance, the long symbol may have a 576-sample length.

In this instance, the long symbol may be generated by performing IFFT with respect to the following permutation in a frequency domain, $\{L-256, L-255, \ldots, L255\} =$ $\{0, 0, 0, 0, 0, 0, 0, 0, 0, 0, 0, 0, 0, 0, 0, 0, 0, 0, 0, 0, 0, 0, 0, 0, 0, 0,$ 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, -1, 1, -1, -1, 1, 1, 1, 1, -1, 1, -1, 1, -1, 1, -1,

1, -1, -1, -1, -1, -1, -1, 1, -1, 1, -1, 1, -1, 1, -1, 1, 1, 1, 1, 1, -1,

1, -1, 1, 1, -1, 1, -1, -1, -1, -1, 1, 1, -1, 1, 1, 1, -1, 1, 1, -1, 1,

1, -1, 1, -1, 1, 1, -1, -1, -1, -1, 1, -1, 1, 1, 1, -1, 1, 1, 1, 1, 1,

-1, -1, -1, 1, 1, 1, 1, -1, -1, 1, 1, -1, 1, -1, -1, 1, 1, -1, 1, -1, 1, 1,

1, -1, -1, -1, 1, 1, -1, 1, -1, -1, -1, 1, -1, 1, 1, 1, 1, 1, 1, 1, -1, 1,

-1, -1, 1, -1, 1, 1, -1, -1, -1, 1, -1, 1, -1, -1, 1, 1, -1, -1, -1, 1, 1,

-1, -1, -1, -1, -1, -1, -1, 1, 1, -1, -1, 1, 1, -1, -1, 1, -1, 1, -1, 1, 1,

-1, -1, 1, -1, -1, 1, 1, 1, 1, 1, 1, -1, 1, 1, -1, 1, -1, -1, -1, 1, -1, -1,

1, -1, -1, 1, 1, -1, 1, 1, 0, 0, 0, 1, 1, 1, -1, -1, -1, 1, -1, -1, 1, -1,

1, -1, 1, -1, -1, -1, 1, 1, -1, 1, 1, -1, -1, 1, 1, 1, 1, 1, -1, -1, 1, 1, 1, 1, -1, -1, -1, 1, -1, 1, 1, -1, 1, 1, 1, -1, 1, -1, 1, -1, -1, -1, 1,

-1, -1, -1, -1, -1, 1, -1, -1, 1, 1, -1, -1, 1, 1, 1, -1, 1, -1, -1, -1, -1, 1, 1, 1, 1, 1, -1, 1, 1, 1, 1, -1, -1, -1, -1, -1, 1, 1, 1, 1, 1, 1, 1, 1,

1, -1, -1, -1, -1, 1, 1, 1, 1, -1, 1, 1, 1, -1, -1, -1, -1, 1, -1, 1, 1,

-1, -1, 1, 1, -1, 1, 1, -1, 1, 1, 1, 1, -1, 1, -1, -1, -1, -1, 1, 1, 1, -1,

-1, 1, 1, -1, -1, -1, 1, -1, -1, 1, -1, -1, -1, 1, -1, 1, -1, 1, 1, 1,

-1, 1, -1, 1, 1, 1, 1, -1, -1, 1, -1, -1, 1, -1, 1, 1, 1, -1, -1, 1, 1, 1,

-1, -1, -1, -1, -1, -1, 1, 1, 1, -1, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0$\}$.

In this instance, the signal symbol may include at least one of a Modulation and Code rate Symbol (MCS) field of a subcarrier, a byte number field, a scrambler seed of the fast wireless communication frame, a cyclic redundancy check (CRC) parity bit field, a tail bit field for initialization of the convolution demodulator.

In this instance, the MCS field may be determined by the following table.

| MCS | CHANNEL CODE RATE | MODULATION SCHEME | TRANSMISSION RATE (Gbps) |
|---|---|---|---|
| 0 | ½ | QPSK | 1.33 |
| 1 | ¾ | QPSK | 1.78 |
| 2 | ½ | 16QAM | 2.67 |
| 3 | ¾ | 16QAM | 3.56 |

In this instance, the signal symbol may further include a reserved bit of one bit after the MCS field of the subcarrier and a reserved bit of 51 bits after the scrambler seed field of the fast wireless communication frame.

In this instance, the data symbol may consist of 576 samples, and a number of the data symbol may be determined depending on a number of bytes of the transmission data to be transmitted via the fast wireless communication frame.

According to an exemplary embodiment of the present invention, there is provided an apparatus for fast wireless communication including: a preamble processing unit performing a preamble process to down-sample a received signal four times, to detect a carrier and a frequency offset, and to synchronize a frame; a demultiplexing unit demultiplexing transmission data included in the received signal into N number of parallel streams (N: positive number greater than 2); N number of demodulation and decoding units connected in parallel for performing OFDM and error correction with respect to each of the N number of parallel streams; and a multiplexing unit multiplexing outputs of the N number of demodulation and decoding units into serial streams.

In this instance, the demultiplexing unit may provide a $(4M+1)^{th}$ (M=0, 1, 2, ...) OFDM symbol from the received signal to a first demodulation and decoding unit of the N number of demodulation and decoding units, provide a $(4M+2)^{th}$ OFDM symbol from the received signal to a second demodulation and decoding unit of the N number of demodulation and decoding units, provide a $(4M+3)^{th}$ OFDM symbol from the received signal to a third demodulation and decoding unit of the N number of demodulation and decoding units, and provides a $(4M+4)^{th}$ OFDM symbol from the received signal to a fourth demodulation and decoding unit of the N number of demodulation and decoding units.

Advantageous Effects

According to the exemplary embodiment of the present invention, it is possible to increase data quantity to be processed in a single process and to increase internal operational speed of the system by adjusting a number of parallel streams in the fast wireless communication system.

Also, according to the exemplary embodiment of the present invention, it is possible to maintain high speed data transmission with a relatively slow system clock speed when implementing a digital circuit of the fast wireless communication system.

Also, according to the exemplary embodiment of the present invention, it is possible to increase data quantity to be processed in a single process when a higher transmission rate is required in a fast wireless communication system, and to reduce power consumption by reducing a multiplexing rate of a parallel stream when a lower transmission rate is required.

BEST MODE FOR CARRYING OUT THE INVENTION

Hereinafter, exemplary embodiments of the present invention will be described in detail by referring to accompanied drawings according to exemplary embodiments of the present invention. When detailed descriptions related to a well-known related function or configuration are determined to make the spirits of the present invention ambiguous, the detailed descriptions will be omitted herein. Also, terms used throughout the present specification are used to appropriately describe exemplary embodiments of the present invention, and thus may be different depending upon a user and an operator's intention, or practices of application fields of the present invention. Therefore, the terms must be defined based on descriptions made through the present invention.

An apparatus for fast wireless communication described as below performs fast data transmissions using time division multiplex wireless transmission. Also, the apparatus for fast wireless communication described below may be applied to a physical layer of Wireless Personal Area Network (WPAN) operating in a high frequency band.

Figure 1:
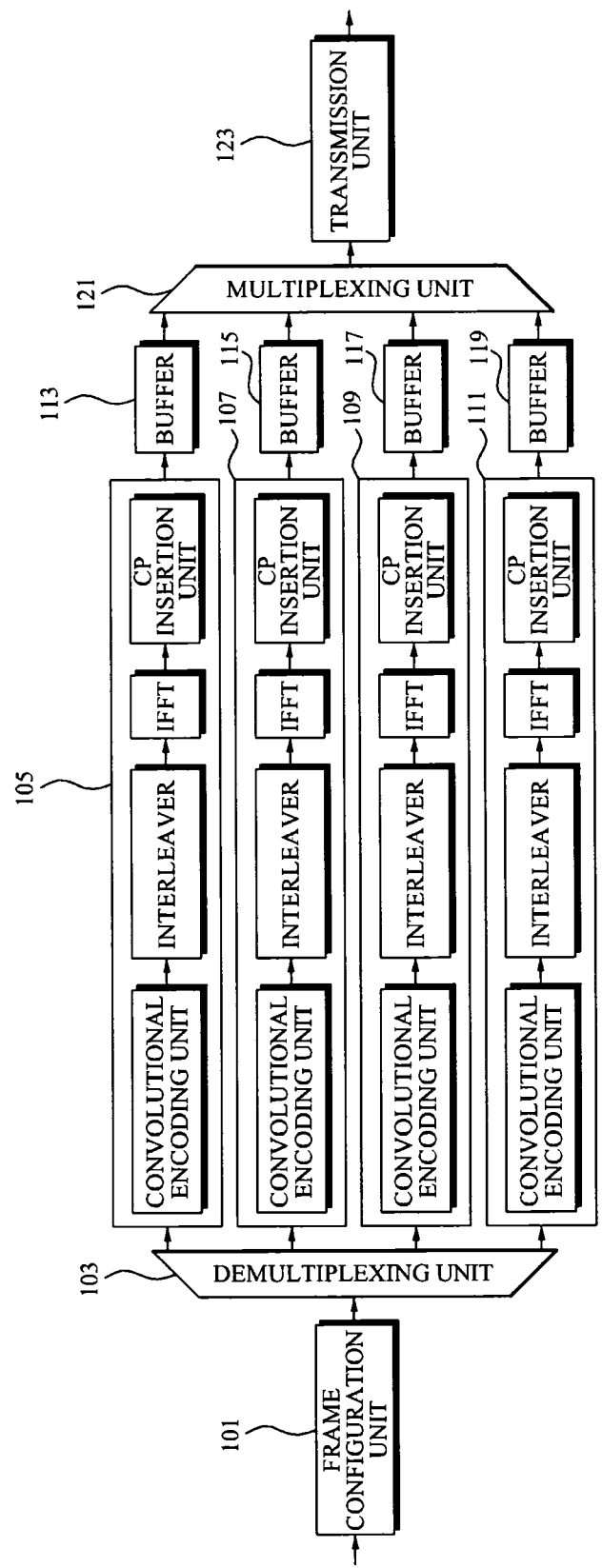
FIG. 1 is a block diagram illustrating an apparatus for fast wireless communication according to an exemplary embodiment of the present invention.

FIG. 1 is a block diagram illustrating a transmitter of an apparatus for fast wireless communication according to an exemplary embodiment of the proposed invention.

Referring to FIG. 1, the transmitter of the apparatus for fast wireless communication may include a frame configuration unit 101 configuring a frame including transmission data, a demultiplexing unit 103 performing demultiplexing of transmission data included in the frame into N number of parallel streams (N: positive number greater than 2). The transmitter of the apparatus for fast communication may also include N number of coding and modulation units 105, 107, 109 and 111, and a multiplexing unit 121 multiplexing outputs of the N number of coding and modulation units 105, 107, 109 and 111 into serial streams. Here, although FIG. 1 illustrates an example where N is 4, N may vary depending on transmission rates required for the system.

Here, the transmitter of the apparatus for fast wireless communication may additionally include buffers 113, 115, 117 and 119 which are used to temporarily store the outputs from the N number of coding and modulating units 105, 107, 109 and 111. This is for the purpose of multiplexing the outputs from the outputs of the N number of coding and modulating units 105, 107, 109.

Also, the transmitter of the apparatus for fast wireless communication may additionally include a transmission unit 123 for the purpose of converting the serial streams which have been multiplexed by the multiplexing unit 121 into analog signals and for the purpose of transmitting to the receiver.

The frame configuration unit 101 may be configured to include a scrambler (not illustrated) which scrambles the transmission data by scrambling polynomials.

Here, the scrambling is performed to reduce a high amplitude of time domain signals. As an example of scrambling occurring polynomials, the following Equation 1 may be applied.

$$G(x)=x^7+x^4+1 \qquad \text{[Equation 1]}$$

Figure 4:
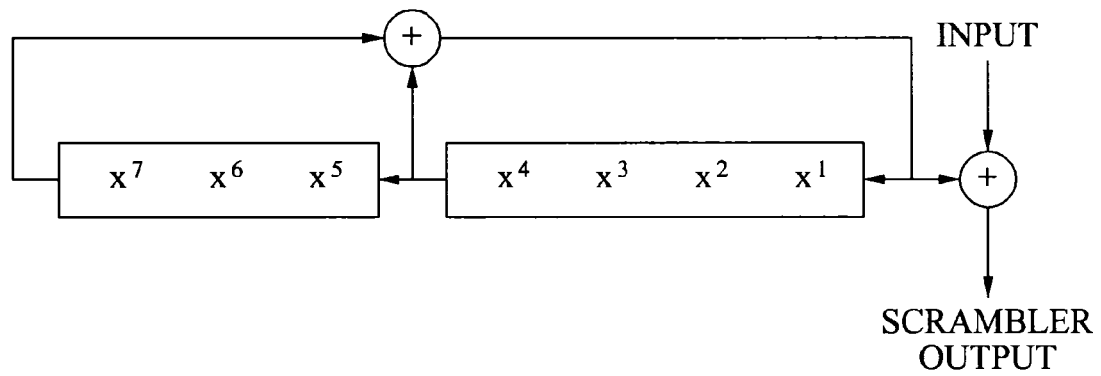
FIG. 4 illustrates an example of a configuration of a scrambler scrambling transmission data of the exemplary embodiments.

An embodiment of an exemplary scrambler scrambling the transmission data by applied Equation 1 is as illustrated in FIG. 4.

The demultiplexing unit 103 performs demultiplexing of the scrambled inputted streams into four parallel streams. Here, the demultiplexing unit 103 can control the number of parallel streams depending on transmission rate requested from the system.

As an example, in case that the transmission rate requested from the system is low, inputted streams are multiplexed into two parallel streams, and in case that the transmission rate requested from the system is high, the inputted streams may be multiplexed into four parallel streams. Here, the transmission rate requested from the system may be provided by a system controlling unit (not illustrated) to the demultiplexing unit 103.

Each of the N number of coding and modulating units 105, 107, 109 and 111 illustrated in FIG. 1 may include a convolutional encoder performing error correction coding with respect to an inputted stream according to a convolution polynomial, an interleaver interleaving the coded inputted stream, an inverse Fast Fourier Transformer (IFFT) performing inverse Fast Fourier Transform (IFFT) to transform the interleaved signal, outputted from the interleaver, into a time domain signal, and a cyclic prefix (CP) insertion unit inserting a cyclic prefix into the time domain signal.

Figure 5:
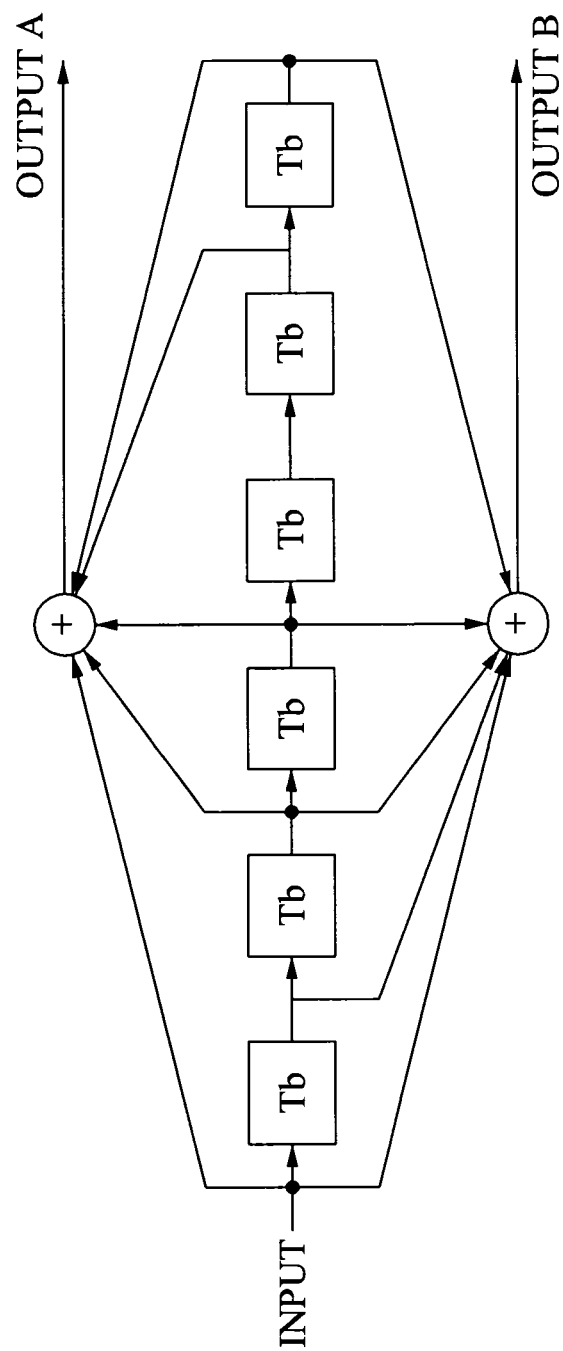
FIG. 5 illustrates an example of a configuration of a convolutional encoder performing convolutional encoding of the exemplary embodiments.

Here, for the polynomial for convolution encoding, $g_0=133_8$ and $g_1=171_8$ may be used. An exemplary embodiment of the convolutional encoder using the polynomials of $g_0=133_8$ and $g_1=171_8$ is as illustrated in FIG. 5.

Figure 6:
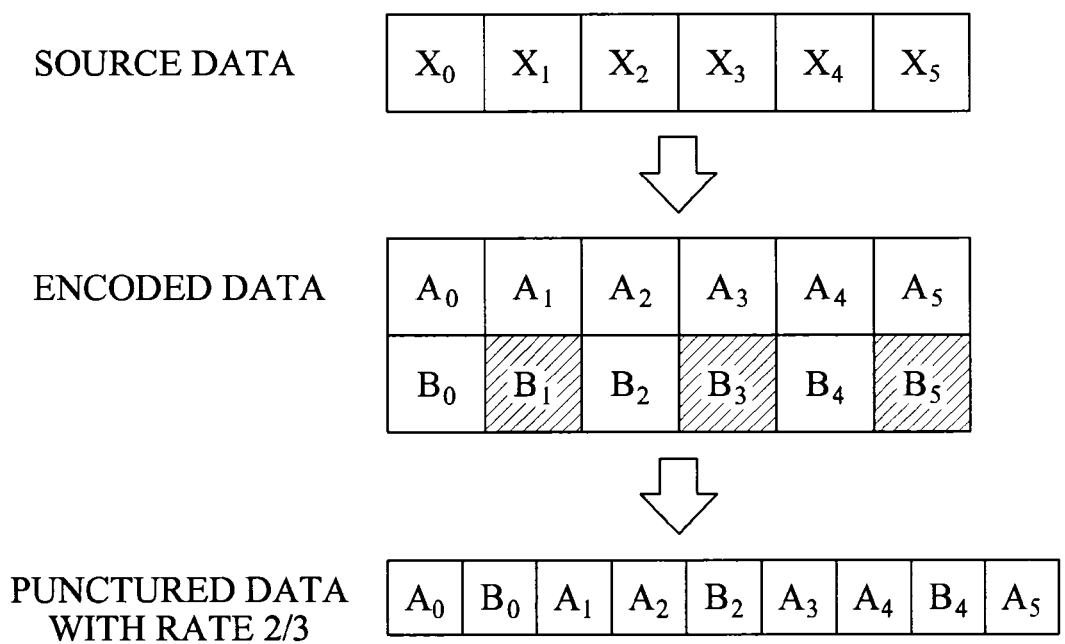
FIG. 6 illustrates an example of puncturing operations for making a channel code rate from ½ to ⅔ of the exemplary embodiments.

Alternatively, in case that the polynomials of $g_0=133_8$ and $g_1=171_8$ are applied, a channel coding rate is ½. An example of a puncturing process to increase the channel coding rate from ½ to ⅔ is as illustrated in FIG. 6. The convolutional encoder may initialize a status using six 0 (zero) bits inserted in the inputted streams. Consequently, the frame configuration unit 101 may insert six 0 (zero) bits into the transmission data for the purpose of initialization of the convolutional encoder. Here, the frame configuration unit 101 is capable of inserting a total of twenty-four 0 (zero) bits into the transmission data for the initializations of each of four convolutional encoders.

As described above, the transmitter of the apparatus for fast communication, by using the fixed system clock speed, may parallelize the scrambled transmission data, and perform the error correction coding and orthogonal frequency division multiplexing (OFDM) via independent routing of the each parallel streams in order to maintain high speed data transmission.

Figure 2:
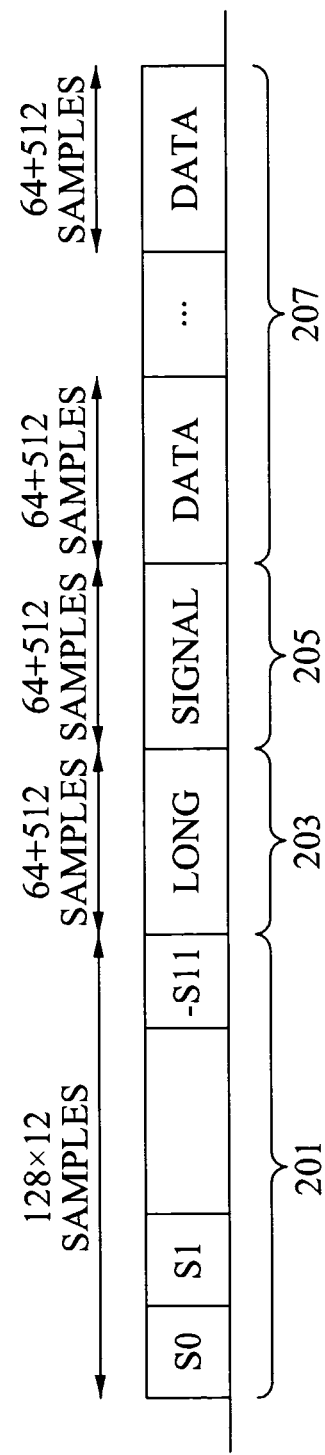
FIG. 2 illustrates an example of a configuration of a fast wireless communication frame for fast wireless communication according to an exemplary embodiment of the present invention.

FIG. 2 illustrates an example of a configuration of a fast wireless communication frame for fast wireless communication according to an exemplary embodiment of the present invention.

Referring to FIGS. 1 and 2, the fast wireless communication frame for fast wireless communication may be generated by the frame configuration unit 101.

This represents that the frame configuration unit 101 is capable of configuring a short symbol giving a notification about a start of the fast wireless communication frame, a long symbol estimating a channel which transmits the fast wireless communication frame, a signal symbol demodulating the fast wireless communication frame, and a data symbol of transmission data to be transmitted via the fast wireless communication frame.

Here, the short symbol, long symbol, and signal symbols are not multiplexed into parallel streams, and error correction coding and OFDM may be performed on each of the N number of coding and modulating units 105, 107, 109, and 111 by any one of the N number of coding and modulation units 105, 107, 109 and 111.

Consequently, the frame structure for fast wireless communication includes a short symbol field 201 giving notification about the start of the fast wireless communication frame, a long symbol field 203 for channel estimation, the signal field 205 having information for modulation, and a data field 207 having transmission data.

The short symbol may be configured by iterating a signal stream having a 128-sample length 12 times, and the 12$^{th}$ iterated signal stream may have a phase difference of 180 degrees from a 11$^{th}$ iterated signal stream.

Also, the short symbol may generate 512 complex numbers using a value corresponding to a subcarrier index shown in the table below, and may generate the 512 complex numbers by performing IFFT.

In this instance, Table 1 shows values which are obtained inputs of a subcarrier index from −256 to 255 of a point IFFT. Here, other indexes are 0 except the indexes shown in Table 1, the real parts and imaginary parts of the complex numbers are identical and a direct current (DC) subcarrier index is 0. The short symbol generated using Table 1 may have a structure that a signal stream of 128-sample length is iterated four times.

TABLE 1

| SUBCARRIER INDEX | VALUES |
| --- | --- |
| −196 | 1 |
| −164 | −1 |
| −180 | 1 |
| −148 | −1 |
| −132 | 1 |
| −116 | 1 |
| −100 | 1 |
| −84 | −1 |
| −68 | 1 |
| −60 | 1 |
| −44 | −1 |
| −28 | −1 |
| −12 | −1 |
| 4 | −1 |
| 20 | −1 |
| 36 | 1 |
| 52 | 1 |
| 72 | −1 |
| 88 | 1 |
| 104 | −1 |
| 120 | −1 |
| 136 | 1 |
| 152 | −1 |
| 168 | −1 |
| 184 | −1 |
| 192 | −1 |

Also, the subcarrier for transmitting the short symbol is generated from a permutation having a maximum length of 31, and the short symbol may be down-sampled so as to have identical power to the subcarrier.

Alternatively, since single data occupies an identical location from among each of the four subcarriers, the iteration property of time domain permutation is maintained even in the case of the down-sampling of the short symbol.

Also, when short symbol is down-sampled to have same power as the subcarriers as above, it is possible to perform a preamble process without using a low pass filter at the receiver.

The IFFT calculation for generating of the short symbol may be performed by the following Equation 2.

$$r_{SHORT}(t) = \sum_{k=-256}^{255} S_k \cdot e^{j2\pi k \cdot \Delta f \cdot t} \qquad \text{[Equation 2]}$$

In Equation 2, $S_k$ is a frequency domain value listed in Table 1, and $\Delta f$ indicates a spatial distance of 3.9 MHz between subcarriers. 12 signal streams which are comprised of a short symbol may be obtained by iterating the results of Equation 2 three times. However, a last 12$^{th}$ signal stream is opposite to a phase of an 11$^{th}$ signal stream.

The long symbol may be configured to have a sample length of 576.

Here, the long symbol may be generated by IFFT calculation with respect to the following frequency domain permutations.

$\{L-256, L-255, \ldots, L255\} =$ $\{0, 0, 0, 0, 0, 0, 0, 0, 0, 0, 0, 0, 0, 0, 0, 0, 0, 0, 0, 0, 0, 0, 0,$ $0, 0, 0, 0, 0, 0, 0, 0, 0, 0, 0, 0, 0, 0, 0, 0, 0, 0, 0, 0, 0, 0,$ $0, 0, 0, 0, 0, 0, 0, 0, 0, 0, -1, 1, -1, -1, 1, 1, 1, 1, -1, 1,$ $-1, 1, -1, -1, 1, -1, 1, -1, -1, -1, -1, -1, 1, -1, 1, -1, 1, -1,$ $1, -1, 1, 1, 1, 1, 1, -1, 1, -1, 1, 1, -1, 1, -1, -1, -1, -1, -1, 1,$ $1, -1, 1, 1, 1, -1, 1, 1, -1, 1, 1, -1, 1, -1, 1, 1, -1, -1, -1, -1,$ $-1, 1, -1, 1, 1, 1, -1, 1, 1, 1, 1, -1, -1, -1, 1, 1, 1, 1, -1, -1,$ $1, 1, -1, 1, -1, -1, 1, 1, -1, 1, -1, 1, 1, 1, -1, -1, -1, 1, 1, -1,$ $1, -1, -1, -1, 1, -1, 1, 1, 1, 1, 1, 1, 1, -1, 1, -1, -1, 1, 1, -1, 1,$ $1, -1, -1, -1, 1, -1, 1, -1, -1, 1, 1, -1, -1, -1, 1, 1, -1, -1, -1$ $-1, -1, -1, -1, 1, 1, -1, -1, 1, 1, -1, -1, 1, 1, -1, 1, 1, -1, 1,$ $-1, 1, -1, -1, 1, 1, 1, 1, 1, 1, -1, 1, 1, -1, 1, -1, -1, 1, -1, -1,$ $1, -1, -1, 1, 1, -1, 1, 1, 0, 0, 0, 1, 1, 1, -1, -1, -1, 1, -1, -1,$ $1, -1, 1, -1, 1, -1, -1, -1, 1, 1, -1, 1, 1, -1, -1, 1, 1, 1, 1, 1,$ $-1, -1, 1, 1, 1, 1, -1, -1, -1, 1, -1, 1, 1, -1, 1, 1, 1, -1, -1, 1,$ $-1, 1, -1, -1, 1, -1, -1, -1, -1, -1, 1, -1, 1, 1, 1, -1, -1, 1, 1,$ $1, -1, 1, -1, -1, -1, 1, 1, 1, 1, 1, -1, 1, 1, 1, 1, -1, -1, -1, -1,$ $-1, 1, 1, 1, 1, 1, 1, 1, 1, 1, -1, -1, -1, -1, 1, 1, 1, 1, -1, 1, 1,$ $1, -1, -1, -1, -1, 1, -1, 1, 1, -1, -1, 1, 1, -1, 1, 1, -1, 1, 1, 1,$ $1, -1, 1, -1, -1, -1, -1, 1, 1, 1, -1, -1, 1, 1, -1, -1, -1, -1, 1,$ $-1, -1, 1, -1, -1, -1, 1, -1, 1, 1, -1, 1, 1, 1, -1, 1, 1, 1, 1, 1,$ -continued $-1, -1, 1, -1, -1, 1, -1, 1, 1, 1, -1, -1, 1, 1, 1, -1, -1, -1, -1,$ $-1, -1, 1, 1, 1, -1, 1, 1, 1, 0, 0, 0, 0, 0, 0, 0, 0, 0, 0, 0, 0, 0,$ $0, 0, 0, 0, 0, 0, 0, 0, 0, 0, 0, 0, 0, 0, 0, 0, 0, 0, 0, 0, 0, 0,$ $0, 0, 0, 0, 0, 0, 0, 0, 0, 0, 0, 0, 0, 0, 0, 0, 0, 0, 0, 0, 0\}.$ The IFFT calculation for generation of the long symbol may be performed with the following Equation 3.

$$r_{LONG}(t) = \sum_{k=-256}^{255} L_k \cdot e^{j2\pi k \cdot \Delta f \cdot (t - T_{CP})}$$ [Equation 3]

In Equation 3, $L_k$ is a frequency domain permutation value, where $\Delta f$ is a subcarrier spatial distance of 3.5 MHz, and $T_{CP}$ is 32 nsec of a cyclic prefix (CP).

Figure 3:
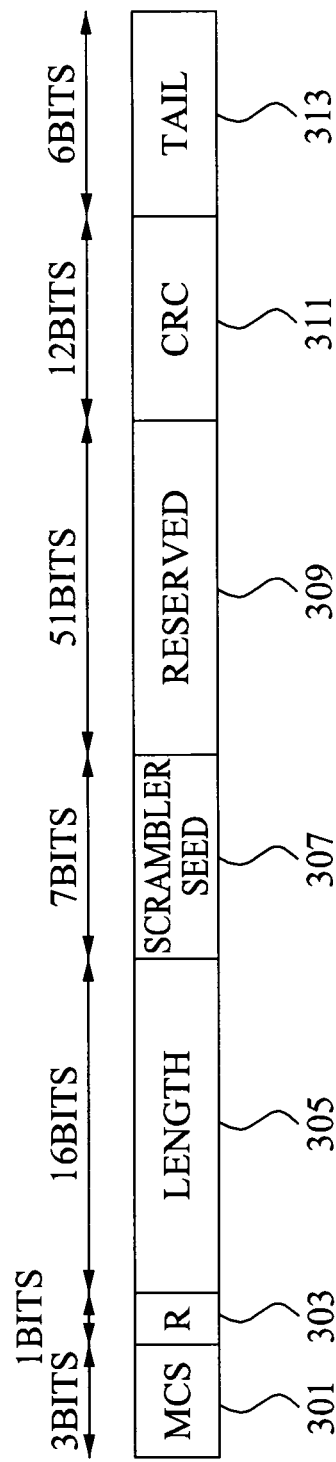
FIG. 3 illustrates an example of a frame configuration of a signal symbol according to an exemplary embodiment of the present invention.

An example of a frame configuration of the above signal symbols is as illustrated in FIG. 3.

Referring to FIG. 3, the signal symbol configuration may include at least one Modulation and Code rate Symbol (MCS) field 301 of a subcarrier, a byte number field 305, a scrambler seed field 307 of the fast wireless communication frame, a cyclic redundancy check (CRC) parity bit field 311, and a tail bit field 313 for initialization of the convolution demodulator.

The MCS field 301 of the subcarriers may include information regarding the MCS of the subcarriers supported by the apparatus for fast communication according to the exemplary embodiment of the present invention.

The following Table 2 illustrates an example of the MCS for the subcarriers for fast wireless communication.

TABLE 2

| MCS | CHANNEL CODE RATE | MODULATION SCHEME | TRANSMISSION RATE (Gbps) |
| --- | --- | --- | --- |
| 0 | ½ | QPSK | 1.33 |
| 1 | ¾ | QPSK | 1.78 |
| 2 | ½ | 16QAM | 2.67 |
| 3 | ¾ | 16QAM | 3.56 |

Aside from the MSC described in Table 2, various other MCSs may be applied.

The signal symbol may additionally include a reserved bit 303 of one bit after the MCS field 301 of the subcarrier and reserved bits 309 of 51 bits after the scrambler seed value field 307 of the fast wireless communication frame.

Here, the reserved bit 303, and reserved bits 309 may be padded with a value of 0.

A byte number field 305 may have length information of the transmission data transmitted in a byte unit in a data symbol area of the fast wireless communication frame.

A CRC code being inserted in the CRC parity field 311 is used to detect a receiving error rate at the receiver.

The following Equation 4 represents an example of CRC generation polynomials for CRC code generation.

$X^{12} + X^{11} + X^3 + X^2 + X + 1$ [Equation 4]

The tail field 313 is padded with six 0s. A CRC error detector (not illustrated) may be aware of termination of decoding operation through six 0s padding the tail field 313.

On the other hand, the above symbol signal may be scrambled with a scrambler which is established as an initial value of 3F of 16 antilogarithm. A subsequently scrambled signal symbol is encoded via ½ error correction encoder, and, before the error corrected 192 bits are interleaved, they are repeated four times to generate data of 768 bits. Data of 768 bits may be modulated by 386 subcarriers using Quadrature phase-shift keying (QPSK). The modulation of a signal symbol may be performed by the frame configuration unit 101 and the coding and modulation units 105 of FIG. 1.

As described above, the signal symbol and data symbol are scrambled prior to the error correction coding. An initial value of a shift register of the scrambler for scrambling of a signal symbol may be established as 3Fs of 16 bits, and an initial value of a shift register of a scrambler for scrambling of data symbol may be randomly established.

Here, the initial value of the shift register for decoding of data symbols is inserted in the scrambler seed field 307 of the signal symbol.

The above data symbols consists of 576 samples, and a number of the data symbols may be adjusted according to a number of bytes of transmitted data desired to be transmitted via the fast wireless communication frame.

The apparatus for fast communication according to an exemplary embodiment of the proposed invention may utilize OFDM modulation technology to transmit data via wireless signals of a millimeter-wave band. Here, examples of OFDM parameters applied on the apparatus for fast communication is illustrated in Table 3 as follows:

TABLE 3

| PARAMETERS | VALUES |
| --- | --- |
| Bandwidth | 1.54 GHz |
| Sampling rate | 2.0 GHz |
| Number of subcarriers | 512 |
| FFT period | 256 nsec |
| Subcarrier spacing | 3.9 MHz |
| Guard interval | 64 samples, 32 nsec |
| Symbol duration | 288 nsec |
| Number of data subcarriers | 384 |
| Number of DC subcarriers | 3 |
| Number of pilot subcarriers | 8 |
| Modulation | QPSK, 16QAM |
| Convolutional code | ½, ¾ |

Figure 7:
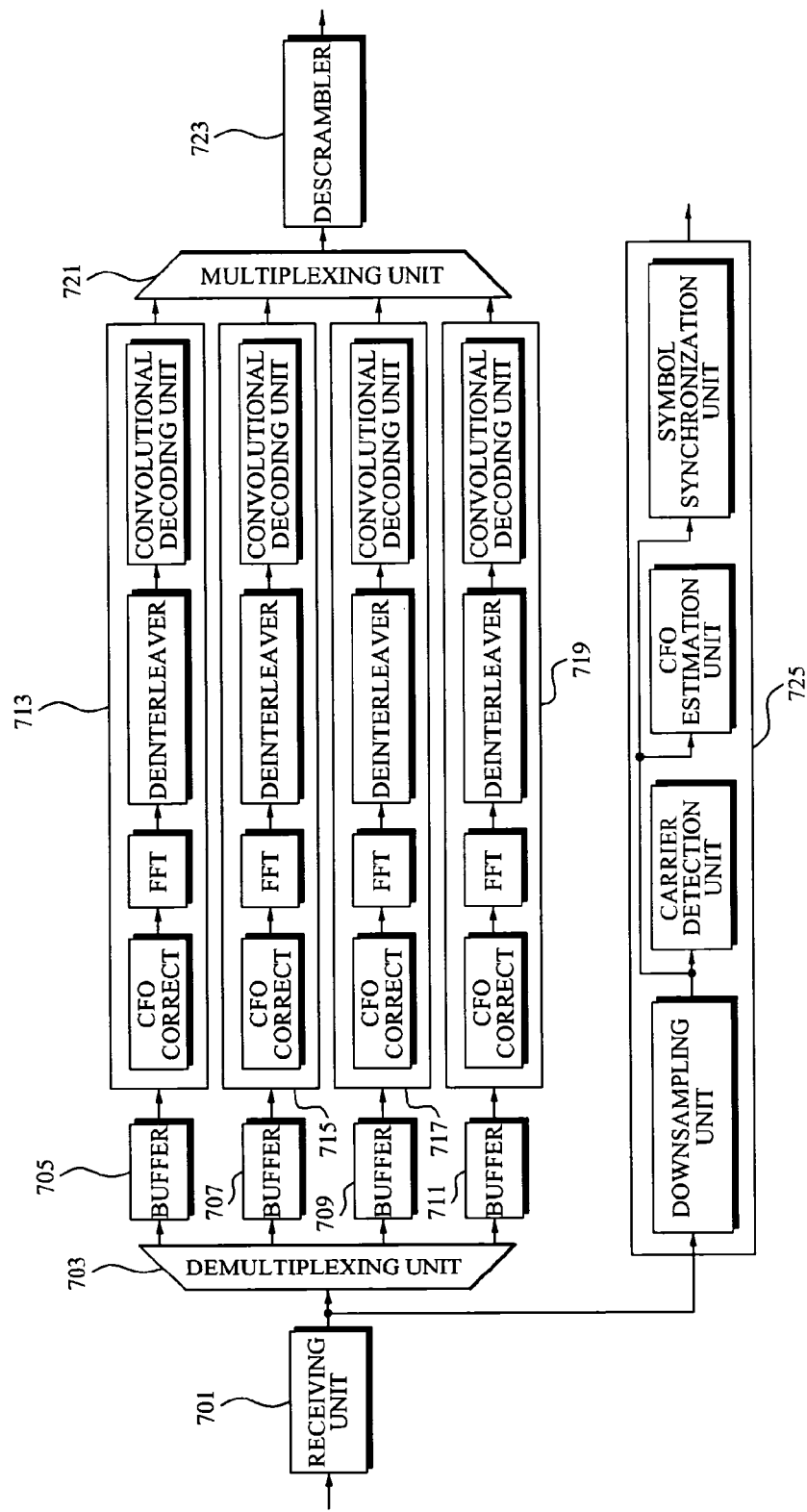
FIG. 7 is a block diagram illustrating a receiver of an apparatus for fast wireless communication according to an exemplary embodiment of the present invention.

FIG. 7 is a block diagram of a receiver of an apparatus for fast communication according to an exemplary embodiment of the proposed invention.

Referring to FIG. 7, the receiver of the apparatus for fast communication may include a receiving unit 701 converting a received signal into a digital signal and a preamble processing unit 725 performing a preamble process to down-sample the received signal four times, to detect a carrier and a frequency offset, and to synchronize a frame. The receiver of the apparatus for fast communication may also include a demultiplexing unit 703 demultiplexing transmission data included in the received signal into N number of parallel streams (N: positive number greater than 2), N number of demodulation and decoding units 713, 715, 717 and 719 connected in parallel for performing OFDM and error correction with respect to each of the N number of parallel streams, and a multiplexing unit 721 multiplexing outputs of the N number of demodulation and decoding units 713, 715, 717 and 719 into serial streams. Here, although FIG. 7 illustrates an example where N is 4, N may vary depending on a transmission rate required for the system.

Here, the receiver of the apparatus for fast communication may further include buffers 705, 707, 709 and 711 which are used to temporarily store outputs from the demultiplexing unit 703.

Also, the receiver of the apparatus for fast communication may further include a descrambler 723 to descramble serial streams which are multiplexed via the multiplexing unit 721.

The preamble processing unit 725, for the purpose of preamble process of the received signals, performs down-sampling of the received signals using a factor of 4. Here, the preamble processing unit 725 may process a preamble process for a short symbol included in the received signal without low pass filtering.

Referring to FIG. 7, a configuration of the preamble processing unit 725 may include a down sampling unit performing down sampling with respect to digital signals from Analog Digital Convert (ADC) conversion using a factor of 4, a carrier detecting unit detecting a frequency size of a carrier from preamble signals (short and long symbols), a Carrier Frequency Offset (CFO) estimation unit estimating CFOs of carrier waves, and a symbol synchronizing unit synchronizing symbols using general synchronization algorithms.

The preamble processing unit 725 may provide information regarding a symbol boundary and symbol synchronization to the demultiplexing unit 703, and the demultiplexing unit 703 may perform demultiplexing of digital signal being inputted based on the symbol boundary information.

As an example, the demultiplexing unit 703 provides a $(4M+1)^{th}$ (M=0, 1, 2, . . . ) OFDM symbol from the received signal to a first demodulation and the decoding unit 713 of the N number of demodulation and decoding units, provides a $(4M+2)^{th}$ OFDM symbol from the received signal to the second demodulation and decoding unit 715 of the N number of demodulation and decoding units, provides a $(4M+3)^{th}$ OFDM symbol from the received signal to the third demodulation and decoding unit 717 of the N number of demodulation and decoding units, and provides a $(4M+4)^{th}$ OFDM symbol from the received signal to the fourth demodulation and decoding unit 719 of the N number of demodulation and decoding units.

As illustrated in FIG. 7, each of the demodulation and decoding units 713, 715, 717 and 719 may be configured to include a CFO correct correcting a frequency offsets of a carrier in a received signal, a fast Fourier transformer (FFT) converting a time domain signal to a frequency domain signal, a de-interleaver de-interleaving the signal converted to the frequency domain, and a convolution decoding unit performing error correction coding the de-interleaved signal.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for fast wireless communication, the apparatus comprising:
a frame configuration unit that configures a frame including transmission data, including configuring a short symbol giving notification about a start of a fast wireless communication frame, configures a long symbol estimating a channel which transmits the fast wireless communication frame, configures a signal symbol demodulating the fast wireless communication frame, and configures a data symbol of transmission data to be transmitted via the fast wireless communication frame;
a demultiplexing unit that demultiplexes the transmission data included in the frame into N number of parallel streams, wherein N is a positive number greater than 2;
N number of coding and modulation units connected in parallel that performs error correction coding and orthogonal frequency division multiplexing (OFDM) with respect to each of the N number of parallel streams and output N number of parallel coded and modulated streams; and
a multiplexing unit that multiplexes the N number of parallel coded and
modulated streams into a single serial stream;
wherein the short symbol generates 512 complex numbers using a value corresponding to a subcarrier index shown in the following table, and generates the 512 complex numbers by performing IFFT (Inverse Fast Fourier Transform),

| SUBCARRIER INDEX | VALUES |
|---|---|
| −196 | 1 |
| −164 | −1 |
| −180 | 1 |
| −148 | −1 |
| −132 | 1 |
| −116 | 1 |
| −100 | 1 |
| −84 | −1 |
| −68 | 1 |
| −60 | 1 |
| −44 | −1 |
| −28 | −1 |
| −12 | −1 |
| 4 | −1 |
| 20 | −1 |
| 36 | 1 |
| 52 | 1 |
| 72 | −1 |
| 88 | 1 |
| 104 | −1 |
| 120 | −1 |
| 136 | 1 |
| 152 | −1 |
| 168 | −1 |
| 184 | −1 |
| 192 | −1. |

2. The apparatus of claim 1, wherein the frame configuration unit scrambles the transmission data according to a scrambling polynomial to provide the scrambled transmission data to the demultiplexing unit.

3. The apparatus of claim 1, wherein the each of the N number of coding and modulation units comprises:
a convolutional encoder performs the error correction coding with respect to an inputted stream according to a convolution polynomial;
an interleaver interleaves the coded inputted stream;
an inverse Fast Fourier Transformer performs inverse Fast Fourier Transform (IFFT) with respect to the interleaved signal, outputted from the interleaver, into a time domain signal; and
a cyclic prefix (CP) insertion unit inserts a cyclic prefix into the time domain signal.

4. The apparatus of claim 1, wherein the short, long, and signal symbol is performed error correction coding and OFDM by any one of the N number of coding and modulation units.

5. The apparatus of claim 1, wherein N corresponds to 4.

6. A method for configuring a frame for fast wireless communication, the method comprising:
configuring a short symbol giving notification about a start of a fast wireless communication frame;
configuring a long symbol estimating a channel which transmits the fast wireless communication frame;
configuring a signal symbol demodulating the fast wireless communication frame; and
configuring a data symbol of transmission data to be transmitted via the fast wireless communication frame,
wherein the short symbol generates 512 complex numbers using a value corresponding to a subcarrier index shown in the following table, and generates the 512 complex numbers by performing IFFT (Inverse Fast Fourier Transform);

| SUBCARRIER INDEX | VALUES |
| --- | --- |
| −196 | 1 |
| −164 | −1 |
| −180 | 1 |
| −148 | −1 |
| −132 | 1 |
| −116 | 1 |
| −100 | 1 |
| −84 | −1 |
| −68 | 1 |
| −60 | 1 |
| −44 | −1 |
| −28 | −1 |
| −12 | −1 |
| 4 | −1 |
| 20 | −1 |
| 36 | 1 |
| 52 | 1 |
| 72 | −1 |
| 88 | 1 |
| 104 | −1 |
| 120 | −1 |
| 136 | 1 |
| 152 | −1 |
| 168 | −1 |
| 184 | −1 |
| 192 | −1 | wherein the real parts and imaginary parts of the 512 complex numbers are identical.

7. The method of claim 6, wherein the short symbol is configured by iterating a signal stream having a 128-sample length 12 times, and the 12$^{th}$ iterated signal stream has a phase difference of 180 degrees from a 11$^{th}$ iterated signal stream.

8. The method of claim 6, wherein the subcarrier for transmitting the short symbol is generated from a permutation having a maximum length of 31.

9. The method of claim 6, wherein the long symbol has a 576-sample length.

10. The method of claim 6, wherein the long symbol is generated by performing IFFT with respect to the following permutation in a frequency domain, $\{L-256, L-255, \ldots, L255\} =$

{0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, −1, 1, −1, −1, 1, 1, 1, 1, −1, 1,

−1, 1, −1, −1, 1, 1, −1, 1, −1, −1, −1, −1, −1, 1, −1, 1, −1, 1, −1,

1, −1, 1, 1, 1, 1, 1, −1, 1, −1, 1, 1, −1, 1, −1, −1, −1, −1, 1,

1, −1, 1, 1, 1, −1, 1, 1, −1, 1, 1, −1, 1, −1, 1, 1, −1, −1, −1, −1

−1, 1, −1, 1, 1, 1, −1, 1, 1, 1, 1, 1, −1, −1, −1, 1, 1, 1, 1, −1, −1

1, 1, −1, 1, −1, −1, 1, 1, −1, 1, −1, 1, 1, 1, −1, −1, −1, 1, 1, −1,

1, −1, −1, −1, 1, −1, 1, 1, 1, 1, 1, 1, 1, −1, 1, −1, −1, 1, 1, −1, 1,

1, −1, −1, −1, 1, −1, 1, −1, −1, 1, 1, −1, −1, −1, 1, 1, −1, −1, −1

−1, −1, −1, −1, 1, 1, −1, −1, 1, 1, −1, −1, 1, −1, 1, −1, 1, 1, 1, −1,

−1, 1, −1, −1, 1, 1, 1, 1, 1, 1, −1, 1, 1, −1, 1, −1, −1, 1, 1, −1, −1,

1, −1, −1, 1, 1, −1, 1, 1, 0, 0, 0, 1, 1, 1, −1, −1, −1, 1, −1, −1,

1, −1, 1, −1, 1, 1, −1, −1, −1, 1, 1, −1, 1, 1, −1, −1, 1, 1, 1, 1,

−1, −1, 1, 1, 1, 1, −1, −1, −1, 1, −1, 1, 1, −1, 1, 1, 1, 1, −1, −1, 1,

−1, 1, −1, −1, 1, 1, −1, −1, −1, −1, −1, 1, −1, −1, 1, 1, −1, −1, 1, 1,

1, −1, 1, −1, −1, 1, 1, 1, 1, 1, −1, 1, 1, 1, 1, −1, −1, −1, −1,

−1, 1, 1, 1, 1, 1, 1, 1, 1, −1, −1, −1, −1, 1, 1, 1, 1, −1, 1, 1,

1, −1, −1, −1, 1, 1, −1, 1, 1, −1, −1, 1, 1, −1, 1, 1, −1, 1, 1, 1,

1, −1, 1, −1, −1, −1, −1, 1, 1, 1, −1, −1, 1, 1, −1, −1, −1, −1, −1, 1,

−1, −1, 1, −1, −1, −1, 1, −1, 1, 1, −1, 1, 1, −1, 1, −1, 1, 1, 1, 1,

−1, −1, 1, −1, −1, 1, 1, −1, 1, 1, 1, −1, 1, 1, −1, −1, −1, −1,

−1, −1, 1, 1, 1, −1, 1, 1, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0}.

11. The method of claim 6, wherein the signal symbol comprises at least one of Modulation and Code rate Symbol (MCS) field of a subcarrier, a byte number field, a scrambler seed field of the fast wireless communication frame, a cyclic redundancy check (CRC) parity bit field, and a tail bit field for initialization of the convolution demodulator.

12. The method of claim 11, wherein the MCS field is determined by the following table,

| MCS | CHANNEL CODE RATE | MODULATION SCHEME | TRANSMISSION RATE (Gbps) |
| --- | --- | --- | --- |
| 0 | ½ | QPSK | 1.33 |
| 1 | ¾ | QPSK | 1.78 |
| 2 | ½ | 16QAM | 2.67 |
| 3 | ¾ | 16QAM | 3.56. |

13. The method of claim 11, wherein the signal symbol further comprises a reserved bit of one bit after the MCS field and a reserved bit of 51 bits after the scrambler seed field of the fast wireless communication frame.

14. The method of claim 7, wherein the data symbol consists of 576 samples, and a number of the data symbol is determined depending on a number of bytes of the transmission data to be transmitted via the fast wireless communication frame.

15. An apparatus for fast wireless communication, the apparatus comprising:
a preamble processing unit that performs a preamble process to down-sample a received signal four times, to detect a subcarrier and a frequency offset, and to synchronize a frame;

a frame configuration unit that configures a frame including transmission data, including configuring a short symbol giving notification about a start of a fast wireless communication frame, configures a long symbol estimating a channel which transmits the fast wireless communication frame, configures a signal symbol demodulating the fast wireless communication frame, and configures a data symbol of transmission data to be transmitted via the fast wireless communication frame;

a demultiplexing unit that demultiplexes transmission data included in the received signal into N number of parallel streams, wherein N is a positive number greater than 2;

N number of demodulation and decoding units connected in parallel that performs OFDM (orthogonal frequency division multiplexing) and error correction with respect to each of the N number of parallel streams and outputting N number of parallel decoded and demodulated streams; and a multiplexing unit that multiplexes the N number of parallel coded and modulated streams into a single serial stream;

wherein the short symbol generates 512 complex numbers using a value corresponding to a subcarrier index shown in the following table, and generates the 512 complex numbers by performing IFFT ('Inverse Fast Fourier Transform),

| SUBCARRIER INDEX | VALUES |
| --- | --- |
| −196 | 1 |
| −164 | −1 |

| SUBCARRIER INDEX | VALUES |
| --- | --- |
| −180 | 1 |
| −148 | −1 |
| −132 | 1 |
| −116 | 1 |
| −100 | 1 |
| −84 | −1 |
| −68 | 1 |
| −60 | 1 |
| −44 | −1 |
| −28 | −1 |
| −12 | −1 |
| 4 | −1 |
| 20 | −1 |
| 36 | 1 |
| 52 | 1 |
| 72 | −1 |
| 88 | 1 |
| 104 | −1 |
| 120 | −1 |
| 136 | 1 |
| 152 | −1 |
| 168 | −1 |
| 184 | −1 |
| 192 | −1. |

16. The apparatus of claim 1 wherein the demultiplexing unit determines N based on a requested transmission rate.

* * * * *